(12) United States Patent
Chang

(10) Patent No.: US 7,431,541 B2
(45) Date of Patent: Oct. 7, 2008

(54) DISPOSABLE CUTTING INSERT FOR BORING CUTTER

(76) Inventor: Hsin-Tien Chang, No. 21, Lane 85, Yuan-Feng Rd., Tai-Ping City, Taichung County (TW)

(*) Notice: Subject to any disclaimer, the term of this patent is extended or adjusted under 35 U.S.C. 154(b) by 90 days.

(21) Appl. No.: 11/699,059

(22) Filed: Jan. 29, 2007

(65) Prior Publication Data
US 2008/0181739 A1    Jul. 31, 2008

(51) Int. Cl.
*B23C 5/20* (2006.01)
*B26D 1/12* (2006.01)
(52) U.S. Cl. .................. 407/113; 407/114; 407/115
(58) Field of Classification Search ......... 407/113–116, 407/66, 67, 103, 107, 30, 33
See application file for complete search history.

(56) References Cited

U.S. PATENT DOCUMENTS

| | | | |
|---|---|---|---|
| 4,131,383 A * | 12/1978 | Powers | 407/114 |
| 5,536,119 A * | 7/1996 | Werner et al. | 407/36 |
| 5,924,824 A * | 7/1999 | Satran et al. | 407/34 |
| 6,843,620 B2 * | 1/2005 | Inayama | 407/114 |
| 7,168,512 B2 * | 1/2007 | Schuffenhauer et al. | 175/426 |

* cited by examiner

*Primary Examiner*—Willmon Fridie

(57) ABSTRACT

A disposable cutting insert for a boring cutter can reduce the roughness of a cut surface and achieve a mirror-like surface effect. The disposable cutting insert has a long curved blade edge, and the radius vertex of the long blade edge is deviated slightly from an external side of a vertex of the radius of cutting edge. A short curved blade edge is formed between the radius arc vertex and the radius arc vertex of the cutting edge. The vertical distance of the short curved blade edge is greater than the feed rate. The cutting edge cuts the work piece and the short curved blade edge can scrape a small size of material precisely for scraping the peak cut by the cutting edge and lower the height of the peak, so as to lower the surface roughness, and produce a mirror-like surface for an internal periphery of a bored hole.

2 Claims, 8 Drawing Sheets

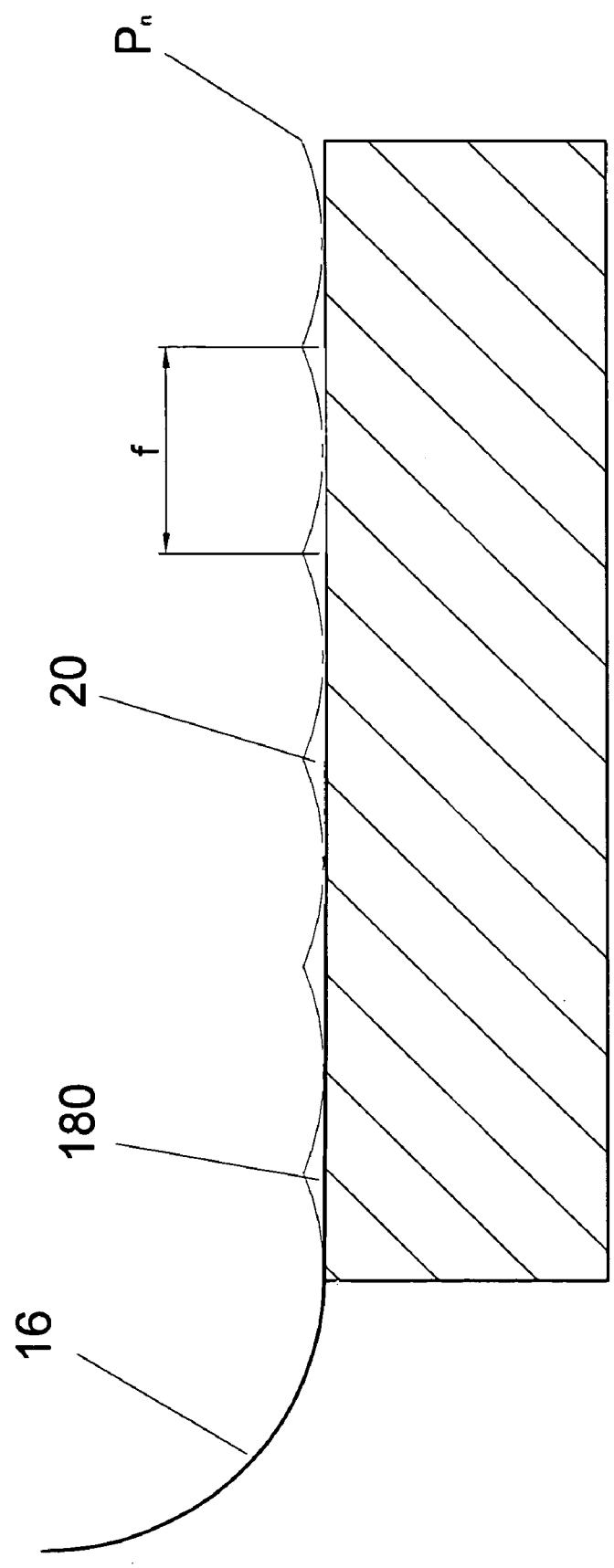

DISPOSABLE CUTTING INSERT FOR BORING CUTTER

FIELD OF THE INVENTION

The present invention relates to a disposable cutting insert for a boring cutter, and more particularly to a disposable cutting insert used for the precision boring manufacture of a metal work piece that requires a mirror-like surface for a bored surface.

BACKGROUND OF THE INVENTION

In general, a conventional internal boring manufacture that requires a mirror-like surface effect on the surface roughness has to go through three cutting tools: a coarse boring cutter, a fine boring cutter and an internal microller burnishing tool. The coarse boring cutter carries out a coarse boring operation and reserves ψ0.2~0.3 mm for a fine boring manufacture, and the fine boring cutter completes a fine boring operation by a feed rate of f=0.04~0.1 mm/rev and reserves ψ0.02~0.04 mm for the polish by the internal microller burnishing tool, such that a mirror-like surface effect with a surface roughness up to Rmax=0.04~1.2 μm can be achieved. This manufacturing method is used extensively for a high precision having a strict requirement on the diameter of a hole including the hole of a bearing of a device with relative movements such as a cylinder hole.

The aforementioned internal boring manufacture for achieving a surface roughness with a mirror-like surface effect needs to employ three cutting tools mainly because a general boring cutter cannot complete the mirror-like surface manufacture directly, and thus it is necessary to use an internal microller burnishing tool to complete the mirror-like surface manufacture. The main reasons and their drawbacks are described as follows:

Referring to FIG. 6 for a conventional disposable cutting insert for a boring cutter 50, a side cut angle $\theta_1$ is defined between a side blade edge 51 and a vertical line of the disposable cutting insert 50, and an end cutting edge angle $\theta_2$ is defined between a front blade edge 52 and a horizontal line, and the side blade edge 51 is linear to the front blade edge 52 and connected to a cutting edge 53. If the disposable cutting insert 50 performs a boring or cutting operation as shown in FIG. 7, then the boring cutter 500 will remove the material of a work piece 60 by the front blade edge 52 and the cutting edge 53. After a surface 61 of the internal periphery of the work piece 60 is cut, the surface roughness is correlated with the radius R of the cutting edge 53 and the feed rate f. Referring to FIG. 8 for the surface roughness of a cut surface, the manufacture conditions include (a) The radius of cutting edge R=0.4 mm; and (b) The feed width f=0.07 (mm/rev). According to the equation for calculating the manufacturing roughness Rmax≈(f2)*1000/(8R) μm, and the foregoing manufacture conditions, the roughness Rmax=(0.072)*1000/(8*0.4) =1.53 μm can be obtained, and it belongs to the category of a fine manufacture. Although the surface is smooth and bright, the requirement for a mirror-like surface manufacture (Rmax=0.1 μm) cannot be met, and thus it is necessary to use other surface manufacture cutters to achieve the roughness (Rmax smaller than or equal to 0.1 μm) for the mirror-like surface manufacture.

Referring to FIG. 9 for a schematic view of a general internal microller burnishing tool, the internal microller burnishing tool 60 is applied to the internal periphery of a work piece that requires a mirror-like surface manufacture and enhance the surface roughness. In FIG. 10, an internal microller burnishing tool 60 press a surface peak of the work piece surface by an extrusion method. Although such method can achieve the mirror-like surface effect and lower the surface roughness, its application still has the following drawbacks:

1. During the manufacture, it is necessary to change the internal microller burnishing tool, and thus this method incurs a longer manufacturing time and a higher cost.

2. The cost of the internal microller burnishing tool is high, and thus the manufacturing cost is naturally high as well.

3. After the internal microller burnishing tool has been used for many times, bits produced by the extrusion will be accumulated in the roll beads (cylinder), and it is necessary to clean the tool from time to time. However, a small amount of bits will remain, and the remained bits will be extruded and adhered onto the surface of the work piece and produces a friction with the surface that may blacken the manufacturing surface.

SUMMARY OF THE INVENTION

In view of the foregoing shortcomings of the prior art, the inventor of the present invention based on years of experience in the related field to conduct extensive researches and experiments, and finally developed a disposable cutting insert for a boring cutter in accordance with the present invention.

Therefore, it is a primary objective of the present invention to provide a disposable cutting insert for a boring cutter to overcome the foregoing shortcomings of the prior art.

BRIEF DESCRIPTION OF THE DRAWINGS

FIG. 5 is a schematic view of the roughness of a bored and cut surface;

DETAILED DESCRIPTION OF THE PREFERRED EMBODIMENTS

Figure 2:
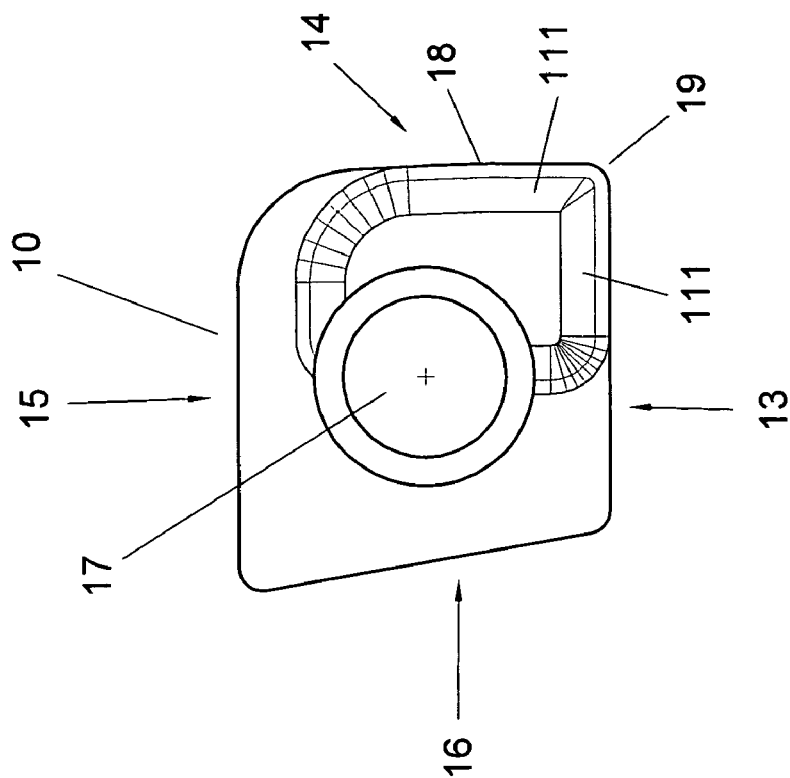
FIG. 2 is a top view of the present invention.
Figure 1:
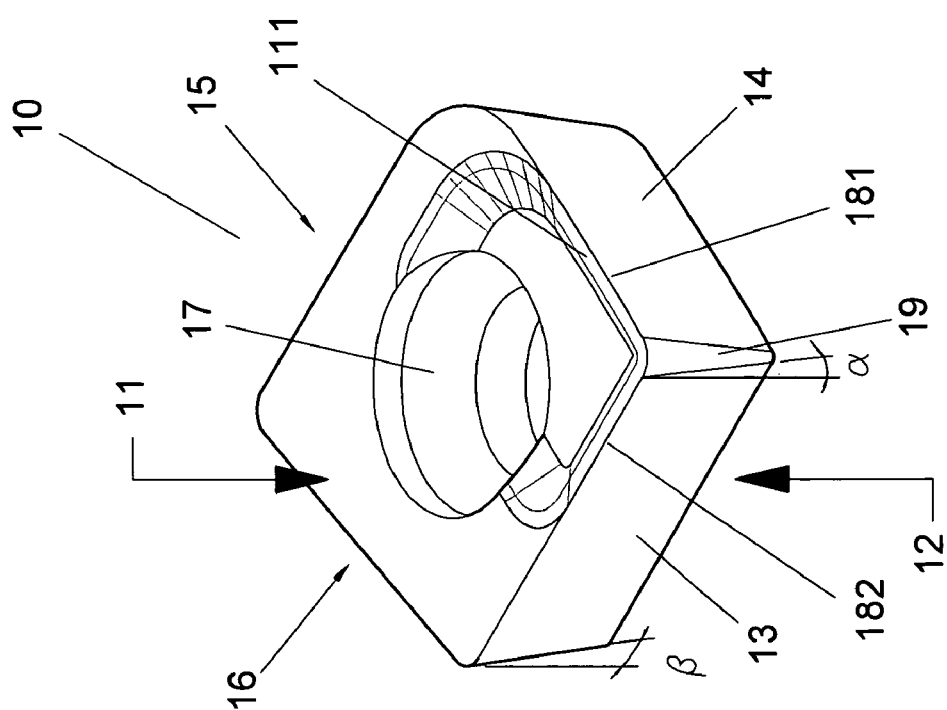
FIG. 1 is a perspective view of the present invention.
Figure 3:
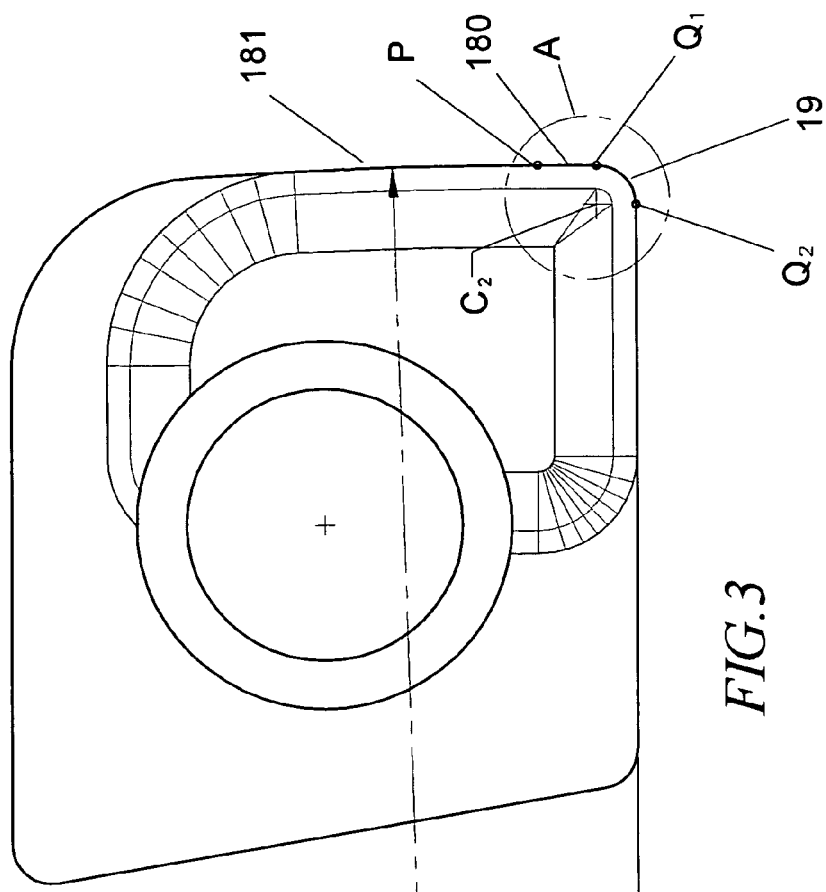
FIG. 3 is an enlarged view of a cutting insert of the present invention.

Referring to FIGS. 1 and 2 for the present invention, a disposable cutting insert 10 for a boring process is comprised of a polygonal body, and defined by an upper plane 11, a lower plane 12 and a plurality of side surfaces 13, 14, 15, 16, wherein a stepped hole 17 penetrates a center position of the disposable cutting insert 10, and each side surface 13, 14, 15, 16 has an appropriate inclination α, β, and the inclination α of the side surface 13, 14 is approximately equal to 11°, and the inclination β of the side surface 15, 16 is approximately equal to 7°, and the upper plane 11 is a cut plane of a cut work piece that produces iron bits, and the lower plane 12 is provided for supporting, and a long blade edge 181 (or the long cutting edge) is formed between the upper plane 11 and the side surface 14, and a cutting edge (the corner radius cutting edge) 19 is formed between two adjacent side surfaces 13, 14, and the long blade edge 18 is substantially a large arc blade edge. Referring to FIG. 3, the radius arc vertex P of the long blade edge 181 is deviated from a small distance d1 and a small angle β at an external side of the radius arc vertex Q1 of the cutting edge 19 (as depicted in a schematic enlarged view of a portion shown in FIG. 3A, and distance d1 is approximately equal to 3~4 μm in this embodiment. In other words, the radius arc vertex P of the long blade edge 181 is protruded slightly from the radius arc vertex Q1 of the cutting edge 19, and thus a short curved blade edge 180 is formed between this radius arc vertex P and the radius arc vertex Q1 of the cutting edge 18. The central position C1 of the arc radius of the long blade edge 18 must be limited, which means that the position of the radius arc vertex P must be limited, because it will affect the distance g between the radius arc vertex P and the radius arc vertex Q1 of the cutting edge 18. Being the vertical length of the short curved blade edge 180, the distance g must be greater than the manufacturing cutting feed f, in order to lower the surface roughness. In general, the distance d2 between two points PQ2 is approximately equal to 0.5~1.5 mm, such that the of the vertical length g of the short curved blade edge 180 falls within 0.2~1.0 mm, and thus it is applicable whenever the cutting feed f falls within 0.15~0.8 mm.

In FIGS. 1 and 2, a rear oblique surface 111 inclined downward to the rear side is disposed between the upper plane 11 and the long blade edge 181 and the front blade edge 182 and the short curved blade edge 180 of the disposable cutting insert 10 for improving the sharpness of the cutting edges.

The disposable cutting insert 10 in accordance with the present invention is used for an internal boring manufacture, and it only needs to go through two cutting tools: a coarse boring cutter and a boring cutter with a disposable cutting insert 10 for the boring cutter in order to achieve the required surface roughness for a mirror-like surface effect, and it no longer requires the internal microller burnishing tool, and thus the invention can save the manufacturing manpower, time and cost.

After the manufacture conducted by the coarse boring cutter, a reserved space of Ψ0.02~0.30 mm is reserved and the manufacture conditions including a feed rate of f=0.1~0.3 mm/rev and a rotation speed of VC=100~300M/mim are adopted to complete the mirror-like surface manufacture.

Figure 3A:
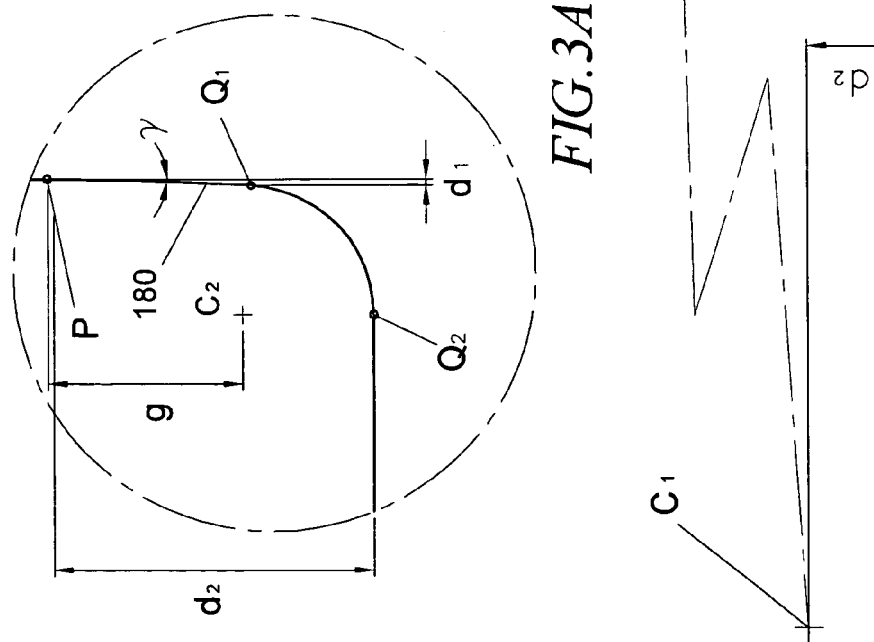
FIG. 3A is an enlarged view of a portion of a cutting insert of the present invention.
Figure 4:
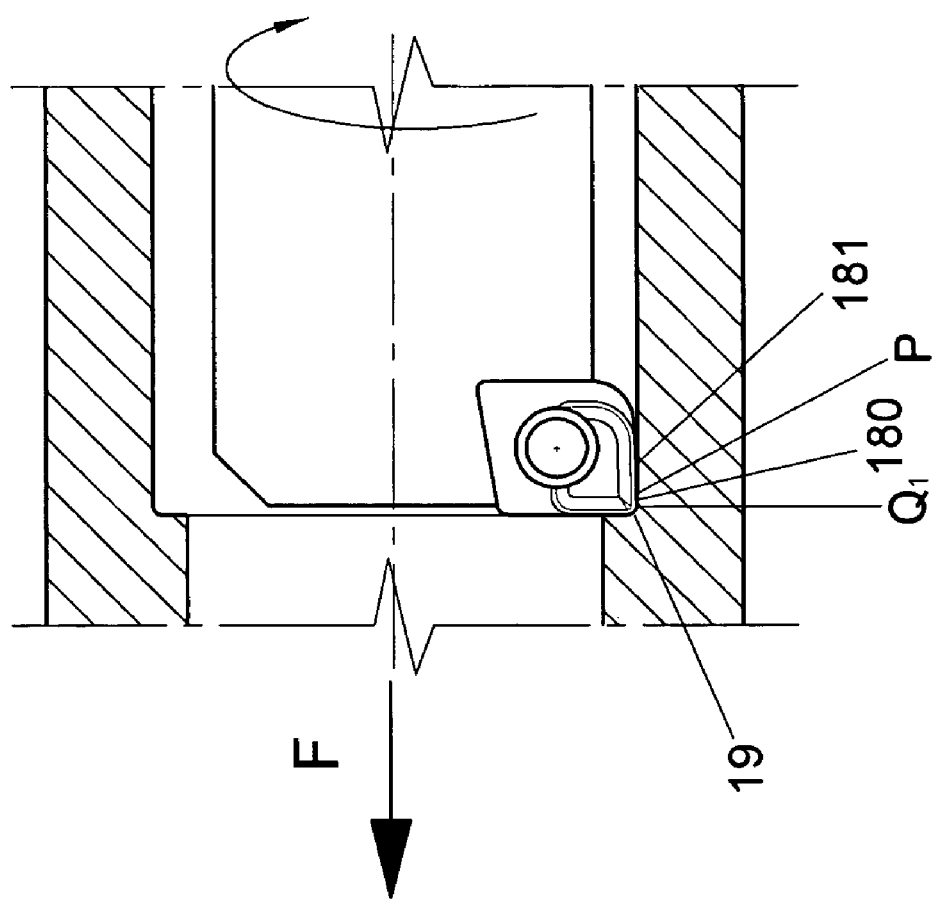
FIG. 4 is a schematic view of a boring and cutting process in accordance with a preferred embodiment of the present invention.
Figure 7:
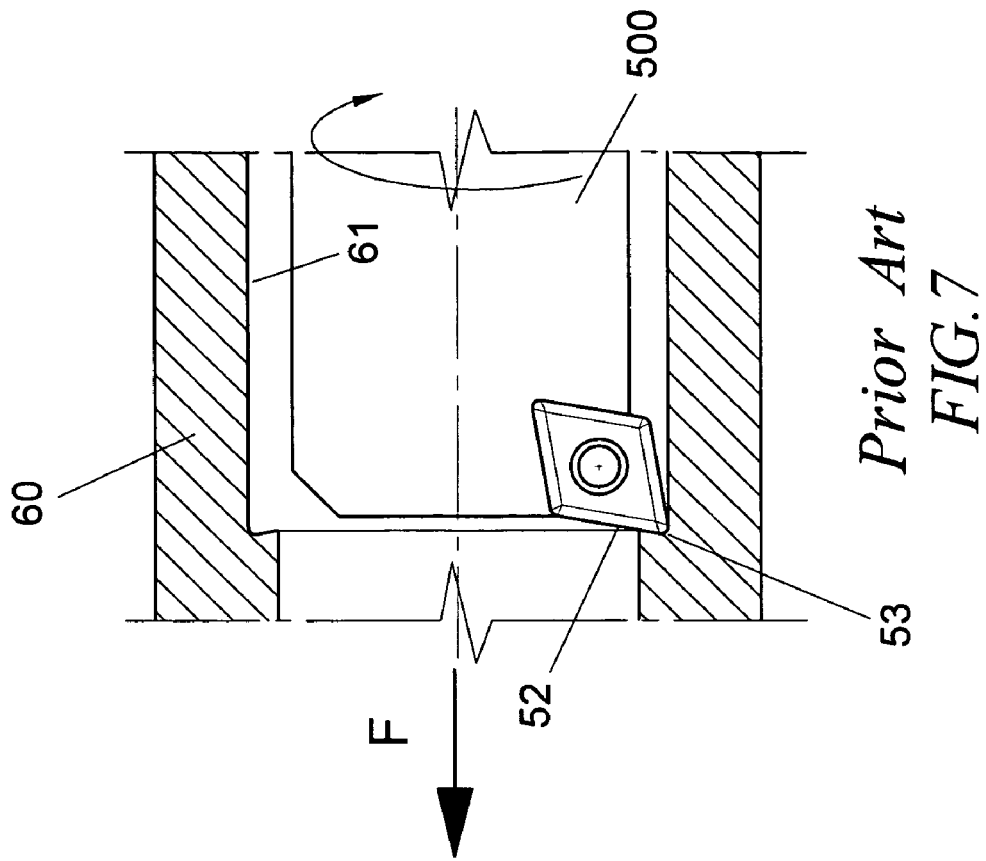
FIG. 7 is a schematic view of a conventional disposable cutting insert applied in a boring cutter for internal boring and cutting.
Figure 6:
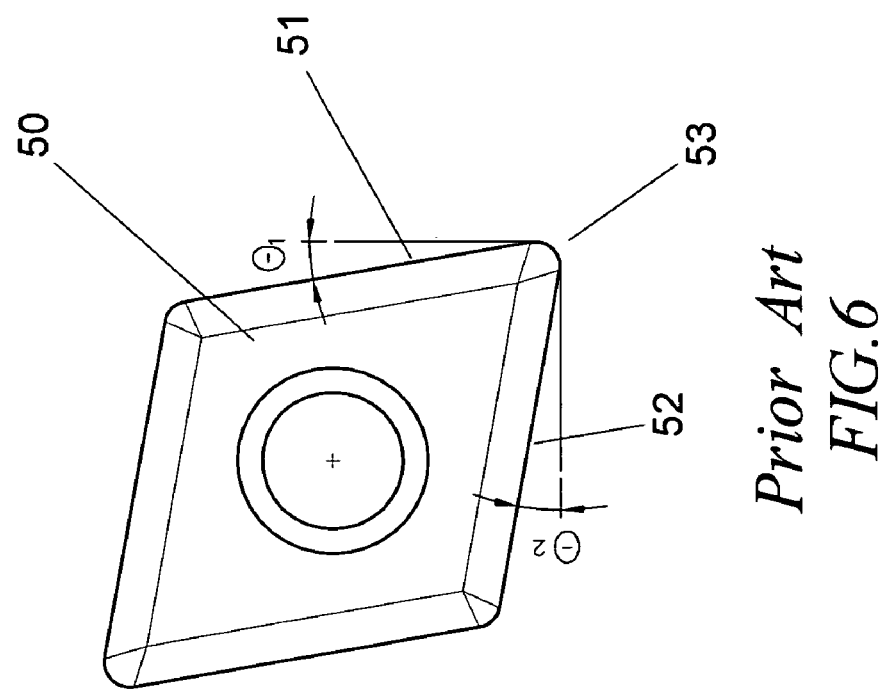
FIG. 6 is a planar view of a conventional disposable cutting insert.
Figure 8:
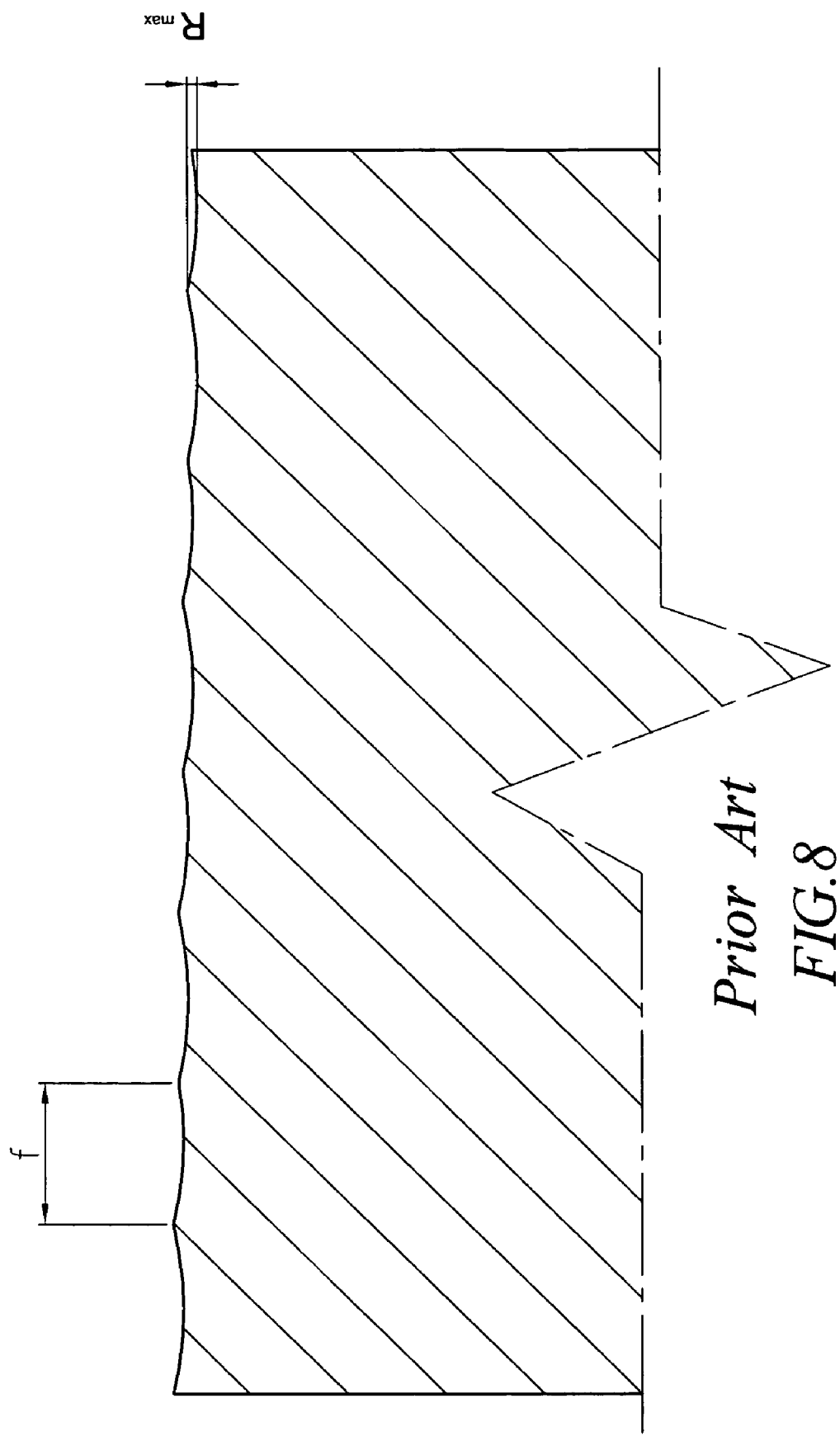
FIG. 8 is a schematic enlarged view of the surface roughness produced after boring and cutting a work piece.
Figure 9:
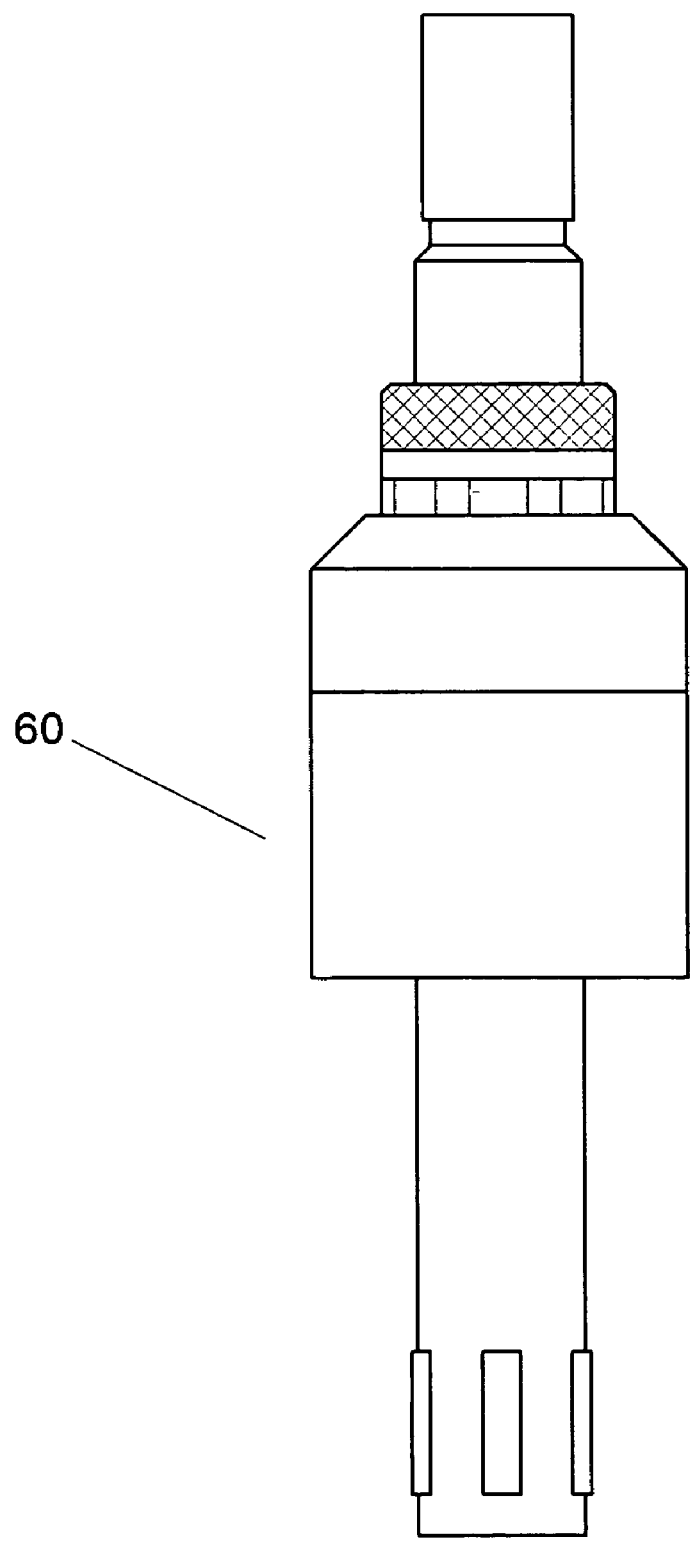
FIG. 9 is a schematic view of a conventional internal microller burnishing tool.
Figure 10:
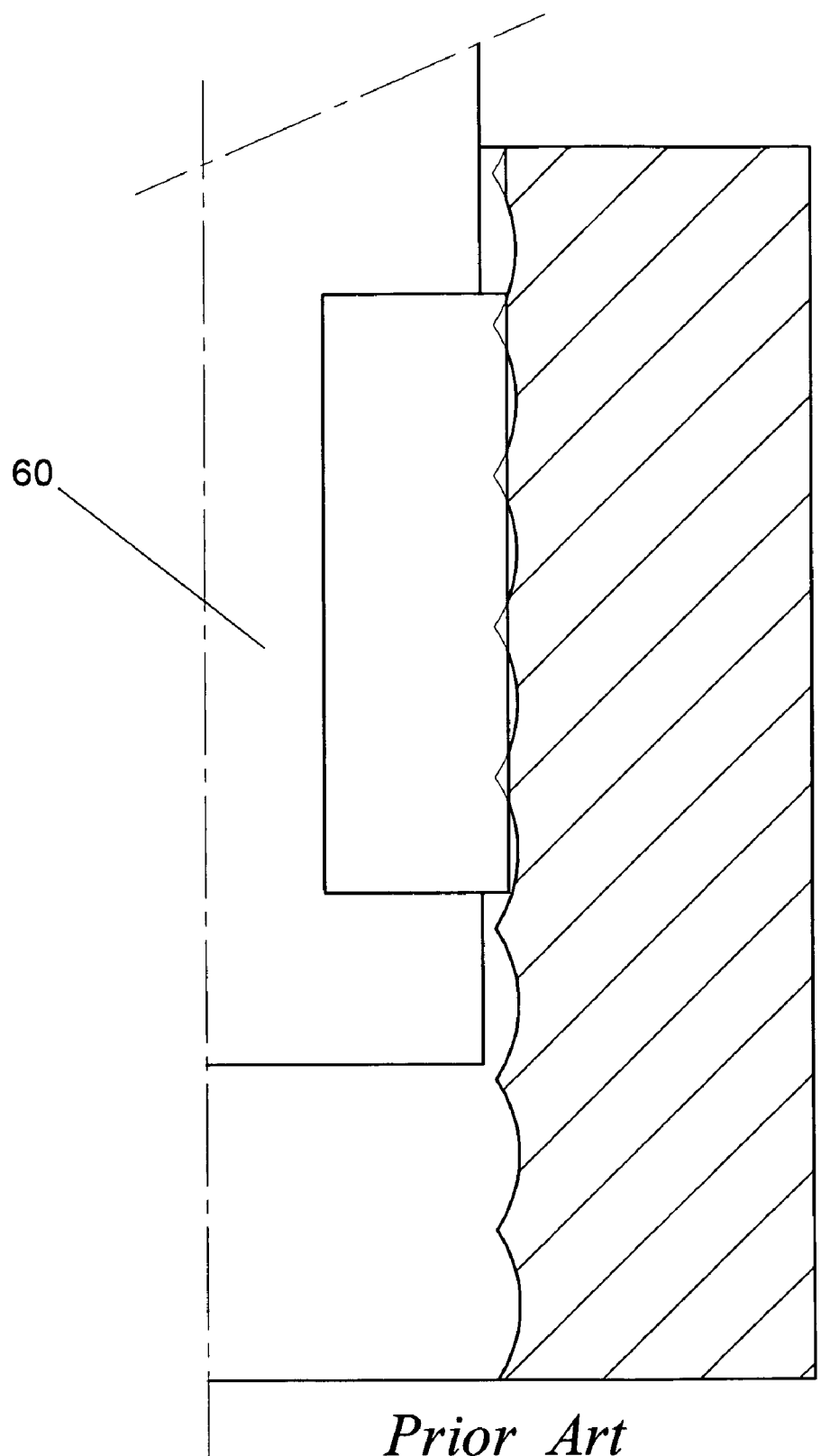
FIG. 10 is a schematic view of a conventional internal microller burnishing tool that extrudes and cuts a surface peak.

Referring to FIGS. 3 and 4, the cutting edge 19 is a position for producing a cut for the internal hole diameter, and the radius arc vertex P of the arc blade edge 181 is protruded slightly from the radius arc vertex Q1 of the cutting edge 19 by approximately 3~4 μm, and thus the short curved blade edge 180 will scrape the material slightly, and the included angle between the radius (which is 50 mm in this embodiment) of the long blade edge 181 and the vertical axis (which is the side cut angle γ as shown in FIG. 3A) is very small. Even if the feed rate is fast, the roughness will remain very low. For example, the feed rate f=0.3 mm/rev in accordance with this embodiment, and the vertical length g (which is the distance between two points PQ1) of the short curved blade edge 180 is approximately equal to 0.6~0.8 mm and greater than the feed rate f=0.3 mm. After the hole is bored, the maximum surface roughness Rmax=0.04 μm, which can achieve the mirror-like surface effect directly without the need of using the internal microller burnishing tool, so as to save manufacturing manpower, time and cost.

Referring to FIG. 5 for an enlarged view of the surface roughness, a short curved blade edge 180 will scrape the wave peak 20 of a cutting path Pn produced by the cutting edge 16 and lower the surface roughness, so as to lower the Rmax and achieve the mirror-like surface effect.

In summation of the description above, the present invention has the following advantages:

1. The design of the short curved blade edge can achieve the cutting function for scraping the peak of the cutting edge. In the same cutting conditions, the present invention can effectively lower the roughness, and achieve the mirror-like surface effect.

2. The disposable cutting insert of the invention is applicable for the present existing disposable cutters, and thus users need not to expend additional expenses. The disposable cutting insert fits a cutter, a boring cutter and other types of cutters.

3. A reserved space of 0.02~0.30 mm is reserved after an internal hole is bored for a work piece that requires a low roughness and a mirror-like surface effect, and thus the present invention can meet the requirements for the mirror-like surface manufacture without using additional cutting tools (such as the internal microller burnishing tool), and thus the invention can lower the cost of cutting tools and the manufacturing time effectively.

In summation of the description above, the disposable cutting insert of the invention comes with a short curved blade edge for reducing the roughness and achieve the mirror-like surface effect, and the work piece can be manufactured directly by the disposable cutter without using additional cutting tools, and thus such cutting insert can be applied extensively for cutting, milling, boring operations. The present invention breaks through the bottleneck of cutter designs, and enhances the performance over the conventional structure and further complies with the patent application requirements and is duly filed for patent application.

While we have shown and described the embodiment in accordance with the present invention, it should be clear to those skilled in the art that further embodiments may be made without departing from the scope of the present invention.

What is claimed is:

1. A disposable cutting insert for a boring cutter, comprising:
a polygonal body which is defined by an upper plane, a lower plane and a plurality of side surfaces, a stepped hole defined through a center position of said disposable cutting insert, said side surfaces having an appropriate inclination, a blade edge formed between said upper plane and said side surface, a cutting edge formed between two adjacent side surfaces, a long blade edge formed between said upper plane and said side surface, said blade edge being a substantially a large arc blade edge, and the radius arc vertex of said long blade edge being deviated from a small distance and a small angle at an external side of an arc vertex of the radius of cutting edge, and a short curved blade edge being formed between said radius arc vertex and the radius arc vertex of said cutting edge.

2. The disposable cutting insert for a boring cutter as claimed in claim 1, wherein a distance between said radius arc vertex and the radius arc vertex of said cutting edge is larger than a cutting feed of the manufacture.

* * * * *